(12) United States Patent
Kim et al.

(10) Patent No.: US 8,090,098 B2
(45) Date of Patent: Jan. 3, 2012

(54) METHOD OF GENERATING MESSAGE AUTHENTICATION CODE USING STREAM CIPHER AND AUTHENTICATION/ENCRYPTION AND AUTHENTICATION/DECRYPTION METHODS USING STREAM CIPHER

(75) Inventors: Woo Hwan Kim, Daejeon (KR); Jung Keun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 810 days.

(21) Appl. No.: 11/938,334

(22) Filed: Nov. 12, 2007

(65) Prior Publication Data
US 2008/0112561 A1    May 15, 2008

(30) Foreign Application Priority Data

Nov. 13, 2006  (KR) .................. 10-2006-0111862
Aug. 13, 2007  (KR) .................. 10-2007-0081305

(51) Int. Cl.
*H04K 1/00* (2006.01)
*H04L 9/00* (2006.01)
*H04L 9/28* (2006.01)

(52) U.S. Cl. .................. 380/28; 380/37; 380/42

(58) Field of Classification Search .......... 380/28, 380/29, 36, 37, 42, 255, 259
See application file for complete search history.

(56) References Cited

U.S. PATENT DOCUMENTS
6,128,737 A * 10/2000 Jakubowski et al. ......... 713/181
2004/0252836 A1  12/2004 Yoshida et al.
2005/0213752 A1  9/2005 Hawkes et al.
2006/0210244 A1  9/2006 Fujita et al.
2006/0233361 A1  10/2006 Hasegawa et al.
2007/0277043 A1* 11/2007 Sorensen ...................... 713/180

FOREIGN PATENT DOCUMENTS
CN      1759562 A     4/2006
JP      2001-211442 A 8/2001
JP      2003-526118 A 9/2003
JP      2004-328629 A 11/2004
KR      1020050064343 6/2005
WO      00/78118 A2   12/2000

OTHER PUBLICATIONS

Phillip Rogaway, et al; "OCB: A Block-Cipher Mode of Operation for Efficient Authenticated Encryption;" ACM Transactions on Information and System Security, vol. 6, No. 3, Aug. 2003, pp. 365-403.

(Continued)

*Primary Examiner* — Edan Orgad
*Assistant Examiner* — Jahangir Kabir
(74) *Attorney, Agent, or Firm* — Ladas & Parry LLP

(57) ABSTRACT

Provided are a method of generating a Message Authentication Code (MAC) using a stream cipher, and authentication/encryption and authentication/decryption methods using a stream cipher.

According to the methods, authentication/encryption is performed using a MAC generated using a stream cipher as an initialization vector of the stream cipher. Therefore, it is unnecessary to use a random number generation algorithm to generate the initialization vector, and thus implementation efficiency can be improved.

In addition, upon generation of a MAC, a plurality of key stream generators perform computation for a plurality of message blocks, respectively. Therefore, the message blocks are computed in parallel at a time, and thus computation efficiency is excellent.

11 Claims, 2 Drawing Sheets

OTHER PUBLICATIONS

Niels Ferguson, et al; "Helix: Fast Encryption and Authentication in a Single Cryptographic Primitive;" T.Johansson (Ed.): FSE 2003, LNCS 2887, pp. 330-346, 2003.

Alfred J. Menezes; "Handbook of Applied Cryptography" CRC Press; ISBN: 0-8493-8523-7, Oct. 1996, Chapter 9.

M. Bellare, et al; "Keying Hash Functions for Message Authentication", Advances in Cryptology—CRYPTO'96, LNCS 1109, pp. 1-15, Springer-Verlag, Jun. 1996.

Tetsu Iwata, et al; "OMAC: One-Key CBC MAC", Advances in Cryptology—FSE 2003, LNCS 2887, pp. 129-153, Springer-Verlag, Mar. 10, 2003.

* cited by examiner

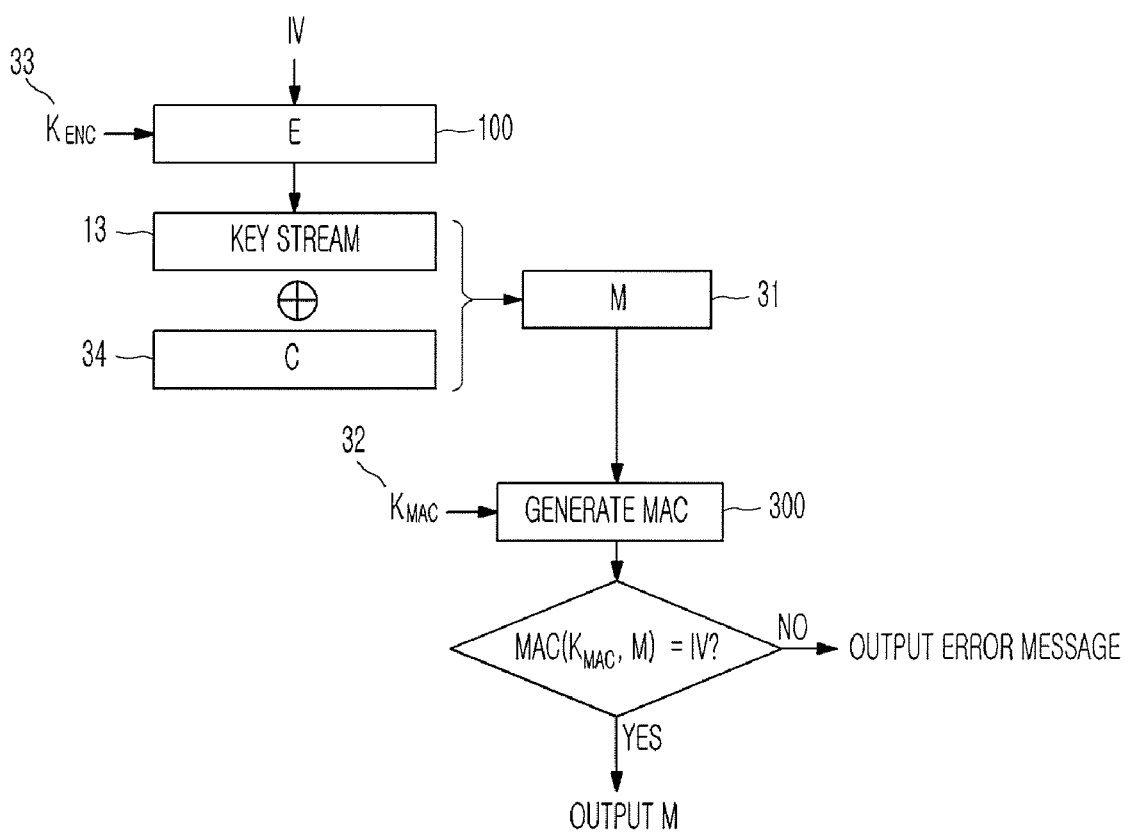

METHOD OF GENERATING MESSAGE AUTHENTICATION CODE USING STREAM CIPHER AND AUTHENTICATION/ENCRYPTION AND AUTHENTICATION/DECRYPTION METHODS USING STREAM CIPHER

CROSS-REFERENCE TO RELATED APPLICATION

This application claims priority to and the benefit of Korean Patent Application No. 2006-111862, filed Nov. 13, 2006 and No. 2007-81305, filed Aug. 13, 2007, the disclosure of which is incorporated herein by reference in its entirety.

BACKGROUND

1. Field of the Invention

The present invention relates to a method of generating a Message Authentication Code (MAC) using a stream cipher and authentication/encryption and authentication/decryption methods using a stream cipher, and more particularly, to a method of generating a MAC that can be computed in parallel using a safe and efficient stream cipher and authentication/encryption and authentication/decryption methods using a stream cipher and using a MAC as an initialization vector of the stream cipher.

2. Discussion of Related Art

MACs are used to provide data integrity. Data integrity can be checked by a function of checking whether or not received data or stored data is the same as original data when the data has been transmitted or stored. Typical methods of generating a MAC use a Hash Message Authentication Code (HMAC) using a keyed hash function, a cipher-based MAC (CMAC) using a block cipher, and so on.

A stream cipher is an encryption primitive frequently used to provide confidentiality, like a block cipher. In general, in comparison with a block cipher, a stream cipher can be implemented in lightweight hardware and operated at high speed in software. In an encryption process, a stream cipher creates a ciphertext by Exclusive-ORing (XORing) a message with a key stream generated using a secret key, and thus a user ignorant of the key streams can readily change a message at a desired part. Due to such a characteristic, a stream cipher is considered to be difficult to provide a MAC function.

A MAC is a value calculated using data as an input value. When data transfer is performed between 2 users, a transmitter adds a MAC behind the data and transmits the data, and a receiver generates a MAC from the data and checks whether or not the generated MAC is the same as the transmitted value. In a field not requiring cryptographic safety, a method which uses a checksum, such as a parity bit, Cyclic Redundancy Check (CRC), etc., and a hash value is frequently used to provide data integrity. Such a method can check a simple error like a transmission error but cannot prevent falsification by a malicious user. To cryptographically solve the problem, a method is used which allows only a user having a previously shared secret key to generate a valid MAC.

Typical methods of generating a MAC using a secret key are a hash-function method using a key and a method using a block cipher. In 1996, Bellare et al. disclosed an HMAC that is a MAC according to a keyed hash function ("Keying Hash Functions for Message Authentication," by M. Bellare, R. Canetti, and H. Krawczyk, Advances in Cryptology-CRYPTO '96, LNCS 1109, pp. 1-15, Springer-Verlag, 1996). According to the HMAC, when a message M is provided, a MAC is generated as $H(K \oplus opad.H(K \oplus ipad.M))$ using a hash function H and a secret key K. Here, opad and ipad denote predetermined constants.

The MAC generation method using a block cipher includes a Cipher Block Chaining (CBC)-MAC algorithm using a CBC operation mode, a CMAC algorithm, and so on. The CBC-MAC algorithm chains a previous block ciphertext and a next block plaintext to create the next block ciphertext, and is a method using a block cipher operation mode frequently used to encrypt data. A CBC-MAC is known to be unsafe for a falsification attack, and various MAC generation methods using a block cipher have been suggested to solve this problem. In 2003, Iwata and Kurosawa have suggested a one-key CBC-MAC (OMAC) that is a modified CBC-MAC ("OMAC: One-Key CBC-MAC," by T. Iwata and K. Kurosawa, Advances in Cryptology-FSE 2003, LNCS 2887, pp. 129-153, Springer-Verlag, 2003). After this, the OMAC has been included in a block cipher operation mode recommendation of National Institute of Standards and Technology (NIST) under the name CMAC.

MAC generation methods using a stream cipher have not been researched as much as the MAC generation methods using a block cipher and a hash function. In the Republic of Korea, a MAC generation method using a stream cipher was first suggested by Jae-woo HAN and Dong-hoon LEE and registered as a domestic patent (Patent Registration No. 0578550, "Method of Generating Message Authentication Code Using Stream Cipher"). The method applies a block cipher-based CBC-MAC to a stream cipher and uses 2 keys to solve the problem of a CBC-MAC. Meanwhile, Ferguson et al. suggested a stream cipher Helix providing an authentication function ("Fast Encryption and Authentication in a Single Cryptographic Primitive," by N. Ferguson et al., Advances in Cryptology-FSE 2003, LNCS 2887, pp. 330-346, Springer-Verlag, 2003). After this, Whiting et al. improved Helix and suggested a stream cipher Phelix to eSTREAM that is a European Union led project in designing the best stream ciphers.

According to a recent trend in stream cipher design, an initialization vector is used in all stream ciphers, and the length of the initialization vector is made to be longer than the length of a secret key in consideration of a Time-Memory Trade Off (TMTO) attack. For example, when a 128 bit secret key is used, it is designed to use an initialization vector equal to or more than a 128 bit value.

The above-mentioned MAC generation method using a stream cipher suggested by Jae-woo HAN et al. has the same safety drawback as the CBC-MAC, and cannot be computed in parallel because data is processed by a chaining method.

A technique simultaneously performing authentication and encryption is referred to as an authenticated encryption method, which is mostly researched in the field of block cipher theory. A widely-known block cipher authenticated encryption method may be an Offset Codebook (OCB) mode suggested by Rogaway et al. ("OCB: A Block Cipher Mode of Operation for Efficient Authenticated Encryption," by P. Rogaway, M. Bellare, J. Black, ACM TISSEC 6(3), pp. 365-403, 2003). While research is being conducted on a stream cipher providing an authentication function, such as above mentioned Phelix, etc., little research corresponding to an operation mode of a block cipher is being conducted in the field of stream ciphers.

Hitherto suggested MAC generation methods are mostly based on a hash function and a block cipher. Since block ciphers are frequently used to provide a variety of functions, such as pseudorandom number generation, message authentication, etc., as well as confidentiality, stream ciphers are not used as much as in the past. In general, stream ciphers are known to have advantages in a low-power and lightweight hardware environment and a high-speed software environment, in comparison with block ciphers. In particular, as a demand for an encryption function increases in a low power and lightweight environment, such as a sensor network, a Radio Frequency Identification (RFID) system, etc., the role of stream ciphers are being expanded.

SUMMARY OF THE INVENTION

The present invention is directed to a method of generating a Message Authentication Code (MAC) that can be computed in parallel using a safe and efficient stream cipher, and authentication/encryption and authentication/decryption methods using a stream cipher and using a MAC as an initialization vector of the stream cipher.

One aspect of the present invention provides a method of generating a MAC using a stream cipher, comprising the steps of: (a) dividing an input message M into k n-bit message blocks; (b) encrypting the respective divided input message blocks using a result obtained by exclusive-ORing (XORing) a secret key $K_{MAC}$ for MAC generation with a number among the number k of the message blocks divided in step (a), as a key and calculating respective intermediate values; (c) XORing the respective intermediate values resulting from step (b); and (d) encrypting, at a key stream generator, the result of step (c) using the secret key $K_{MAC}$ for MAC generation and generating a MAC.

In step (b), the respective intermediate values may be calculated by the following formula: $h_i = E_n(K_{MAC} \oplus i, m_i)$, wherein the respective message blocks are $m_1, \ldots, m_k$. In step (c), an intermediate value h obtained by XORing the respective intermediate values may be calculated by the following formula: $h = \oplus_{i=1}^{k} h_i$. In step (d), the MAC may be expressed by the following formula: $MAC(K_{MAC}, M) = E_n(K_{MAC}, h)$.

When lengths of the respective message blocks $m_1, \ldots, m_k$ are not a multiple of n, they may be made to be a multiple of n. The lengths of the respective message blocks $m_1, \ldots, m_k$ may be made to be a multiple of n by adding 100 . . . 0 to the respective message blocks $m_1, \ldots, m_k$.

In step (b), the respective intermediate values may be calculated in parallel.

Another aspect of the present invention provides an authentication/decryption method using a stream cipher, comprising the steps of: (a) generating a key stream using a stream cipher initialization vector IV and a secret key $K_{ENC}$ for message encryption; (b) XORing the key stream with a ciphertext C to generate a plaintext M; (c) generating a MAC $MAC(K_{MAC}, M)$ for the plaintext M; and (d) when the stream cipher initialization vector IV is the same as the MAC $MAC(K_{MAC}, M)$, determining the ciphertext C to be valid, and outputting the plaintext M for the valid ciphertext C.

In step (d), when the stream cipher initialization vector IV is not the same as the MAC $MAC(K_{MAC}, M)$, an error message may be output.

In step (c), the MAC $MAC(K_{MAC}, M)$ for the plaintext M may be generated from the plaintext M and a secret key $K_{MAC}$ for MAC generation.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 3 is a block diagram showing an authentication/decryption method using a stream cipher according to an exemplary embodiment of the present invention.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
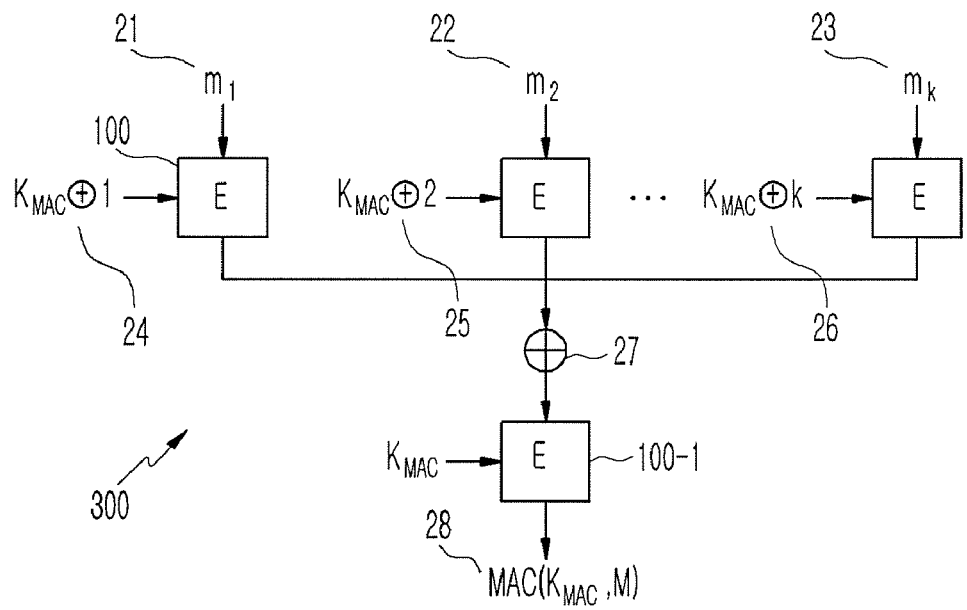
FIG. 1 is a block diagram of a Message Authentication Code (MAC) generator for generating a MAC using a stream cipher according to an exemplary embodiment of the present invention.

FIG. 1 is a block diagram of a Message Authentication Code (MAC) generator 300 for generating a MAC that can be computed in parallel using a stream cipher according to an exemplary embodiment of the present invention. A process of generating a MAC in the MAC generator 300 will be described step by step below.

1. An input message M is divided into n-bit message blocks. The message blocks are denoted by $m_1, \ldots, m_k$ 21 to 23. When the lengths of the respective message blocks $m_1, \ldots, m_k$ 21 to 23 are not a multiple of n, 100 . . . 0 is added to the respective message blocks so that the lengths of the respective message block become a multiple of n.

2. Intermediate values $h_i = E_n(K_{MAC} \oplus i, m_i)$ are calculated as i=1, 2, . . . , k. A majority of the time taken for generating a MAC is required for step 2, and the calculation of step 2 may be performed in parallel. In other words, k key stream generators 100 receive secret keys 24 to 26 used for calculating the intermediate values of the respective message blocks $m_1$ to $m_k$ 21 to 23 and calculate the intermediate values $h_i = E_n(K_{MAC} \oplus i, m_i)$. Here, $K_{MAC}$ denotes a secret key for MAC generation, and $E_n(K, m_i)$ is an encryption algorithm performed for the message blocks $m_1$ to $m_k$ using K as a key by the key stream generators 100.

3. The respective intermediate values obtained by the k key stream generators 100 are exclusive-ORed (XORed) 27, and thereby an intermediate value h is calculated by the following formula: $h = \oplus_{i=1}^{k} h_i$.

4. As a final result value, a MAC is generated as follows: $MAC(K_{MAC}, M) = E_n(K_{MAC}, h)$ when the secret key for MAC generation is $K_{MAC}$, and the message is M.

Figure 2:
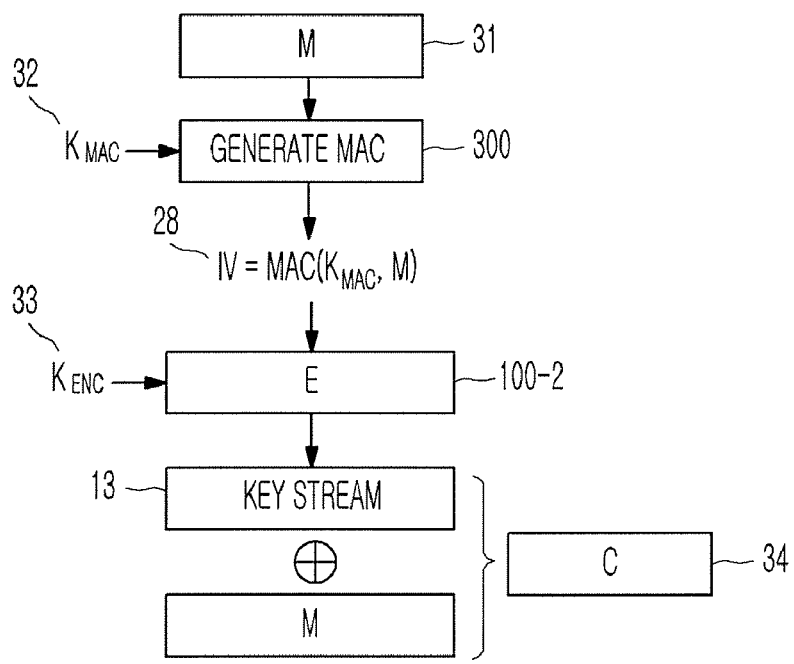
FIG. 2 is a block diagram showing an authentication/encryption method using a stream cipher according to an exemplary embodiment of the present invention.

FIG. 2 is a block diagram showing an authentication/encryption method using a stream cipher according to an exemplary embodiment of the present invention. The authentication/encryption process will be described step by step below.

1. Using the method of FIG. 1, the MAC generator 300 receives a plaintext M 31 and a secret key $K_{MAC}$ 32 for MAC generation, and generates a MAC $MAC(K_{MAC}, M)$ 28 for the plaintext M 31.

2. A stream cipher initialization vector IV is set to be the MAC $MAC(K_{MAC}, M)$ 28.

3. The key stream generators 100 generate an n-bit key stream 13 using the $MAC(K_{MAC}, M)$ 28 set to be the stream cipher initialization vector IV and a secret key $K_{ENC}$ 33 for message encryption. Subsequently, a ciphertext C 34 is generated by XORing the generated key stream 13 with the plaintext M.

4. The ciphertext C 34 for the plaintext M is output which is obtained when the secret key for MAC generation is $K_{MAC}$, and the secret key for message encryption is $K_{ENC}$.

FIG. 3 is a block diagram showing an authentication/decryption method using a stream cipher according to an exemplary embodiment of the present invention. The authentication/decryption process will be described step by step below.

1. First, the key stream generators 100 generate a key stream 13 from a ciphertext C using a stream cipher initialization vector IV and a secret key $K_{ENC}$ 33 for message encryption. Subsequently, a plaintext M 31 is generated by XORing the generated key stream 13 with the ciphertext C 34.

2. Using the method of FIG. 1, the MAC generator 300 generates a MAC MAC($K_{MAC}$, M) for the plaintext M 31 from the plaintext M 31 and a secret key $K_{MAC}$ 32 for MAC generation.

3. When the stream cipher initialization vector IV is the same as the MAC MAC($K_{MAC}$, M), the ciphertext C 34 is determined to be valid, and the plaintext M for the valid ciphertext C 34 is output. On the other hand, when the stream cipher initialization vector IV is not the same as the MAC MAC($K_{MAC}$, M), an error message "ciphertext is not valid" is output, and the process is terminated.

In FIGS. 1 to 3, like numerals indicate like elements, but FIGS. 1 to 3 show different exemplary embodiments.

The respective MAC generation methods according to exemplary embodiments of the present invention can be applied when a data transmission system for transmitting a message generates a MAC, and a data reception system for receiving data to which a MAC is added generates a target MAC for comparison with a received MAC.

In addition, the authentication/encryption method according to an exemplary embodiment of the present invention can be applied when a data transmission system for transmitting data, to which an authenticated/encrypted MAC is added, authenticates and encrypts data, and the authentication/decryption method according to an exemplary embodiment of the present invention can be applied when a data reception system for receiving data, to which an authenticated/encrypted MAC is added, authenticates and decrypts a received authenticated ciphertext.

According to stream ciphers, information on a plaintext can be obtained from a ciphertext by repeatedly using the same cipher initialization vector, and thus the same cipher initialization vector must not be repeatedly used. Methods used for generating a cipher initialization vector include a method of generating a random cipher initialization vector using a random number generation algorithm and a method using non-repeating information, such as a counter. The random number generation algorithm must safely generate an initial seed to obtain enough entropy and must be implemented separately from an encryption algorithm. When a counter is used, there is a difficulty in that counter information must be safely stored and updated. Since a MAC may be considered as a value representing a message, it is possible to use different cipher initialization vectors for different messages using a MAC as a cipher initialization vector.

The present invention can be applied not only to a specific stream cipher but also to most stream ciphers using a cipher initialization vector.

The present invention can be employed as an operation method of a stream mode corresponding to an authentication/encryption operation mode of a block cipher when a cipher function is provided in a low power and lightweight environment, such as a Radio Frequency Identification (RFID) system, a sensor network, and so on.

As described above, the methods of the present invention can be implemented as a program and stored in a recording medium, such as a compact disk read-only memory (CD-ROM), a random-access memory (RAM), a read-only memory (ROM), a floppy disk, a hard disk, a magneto-optical disk, etc., in a computer-readable form.

As described above, the present invention generates a MAC that can be computed in parallel using a safe and efficient stream cipher, and performs authentication/encryption using the generated MAC as an initialization vector of the stream cipher.

Since authentication/encryption is performed using the MAC generated using the stream cipher as the initialization vector of the stream cipher, it is unnecessary to use a random number generation algorithm to generate the initialization vector. Therefore, it is possible to improve implementation efficiency.

In addition, upon generation of the MAC, a plurality of key stream generators 100 perform computation for a plurality of message blocks, respectively. Therefore, the message blocks are computed in parallel simultaneously, and thus computation efficiency is excellent.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A computer implemented method of generating a Message Authentication Code (MAC) by a processor using a stream cipher, comprising the steps of:

(a) dividing an input message M into k n-bit message blocks, wherein k is an integer number, wherein each of the respective divided input message blocks have a unique integer number represented by the respective K integer number;

(b) encrypting by a processor each of the respective divided input message blocks using a result obtained by exclusive-ORing (XORing) with a different key, wherein the results by XORing each of the divided input message blocks has a different key from any of the other divided input message blocks, wherein each of the different keys is configured with a secret key $K_{MAC}$ for MAC generation with the unique integer number associated with the respective divided input message block, calculating respective intermediate values, and wherein in step (b), the respective intermediate values hi are calculated by the following formula:

$$h_i = E_n(K_{MAC} \oplus i, m_i),$$

wherein the k n-bit message blocks obtained by dividing the input message M are denoted by m1, m2, ..., mk, one of the message blocks is denoted by mi, and En(K, mi) denotes an encryption algorithm performed for the message blocks mi using K as a key by the key stream generator; and c) XORing the respective intermediate values resulting from step (b); and (d) encrypting, at a key stream generator, the result of step (c) using the secret key $K_{MAC}$ for MAC generation and generating a MAC.

2. The computer implemented method of claim 1, wherein in step (c), the respective intermediate values are XORed by the following formula:

$$h = \oplus_{i=1}^{k} h_i,$$

wherein h denotes a value obtained by XORing the respective intermediate values.

3. The computer implemented method of claim 2, wherein in step (d), the MAC is expressed by the following formula:

$$MAC(K_{MAC}, M) = En(K_{MAC}, h),$$

wherein $MAC(K_{MAC}, M)$ denotes the MAC.

4. The computer implemented method of claim 1, wherein in step (a), when lengths of the respective message blocks m1 to mk are not a multiple of n, the lengths are made to be a multiple of n.

5. The computer implemented method of claim 4, wherein the lengths of the respective message blocks m1, ..., mk are made to be a multiple of n by adding 100...0 to the respective message blocks m1 to mk.

6. The computer implemented method of claim 1, wherein in step (b), the respective intermediate values are calculated in parallel.

7. A computer implemented authentication/encryption method using a stream cipher, comprising the steps of:
 (a) inputting a plaintext M and a secret key $K_{MAC}$ for Message Authentication Code (MAC) generation and generating by a processor a MAC $MAC(K_{MAC}, M)$ for the plaintext M according to the method of generating the MAC by a processor using a stream cipher, comprising the steps of:
 (a1) dividing the plain text M into k n-bit message blocks, wherein k is an integer number,
 wherein each of the respective divided input message blocks have a unique integer number represented by the respective K integer number;
 (a2) encrypting by a processor each of the respective divided input message blocks using a result obtained by exclusive-ORing (XORing) with a different key,
 wherein the results by XORing each of the divided input message blocks has a different key from any of the other divided input message blocks,
 wherein each of the different keys is configured with a secret key $K_{MAC}$ for MAC generation with the unique integer number associated with the respective divided input message block, calculating respective intermediate values, and
 wherein the respective intermediate values hi are calculated by the following formula:

$$h_i = E_n(K_{MAC} \oplus i, m_i),$$

wherein the k n-bit message blocks obtained by dividing the input message M are denoted by m1, m2, ..., mk, one of the message blocks is denoted by mi, and En(K, mi) denotes an encryption algorithm performed for the message blocks mi using K as a key by the key stream generator;
 (a3) XORing the respective intermediate values resulting from step (a2); and
 (a4) encrypting, at a key stream generator, the result of step (a3) using the secret key $K_{MAC}$ for MAC generation and generating a MAC,
 (b) setting the MAC $MAC(K_{MAC}, M)$ generated in step (a) as the stream cipher initialization vector IV;
 (c) generating an n-bit key stream using the MAC $MAC(K_{MAC}, M)$, which is the stream cipher initialization vector IV, and a secret key KENC for message encryption;
 (d) exclusive-ORing (XORing) the generated key stream with the plaintext M to generate a ciphertext C; and
 (e) outputting the ciphertext C.

8. A computer implemented authentication/decryption method using a stream cipher, comprising the steps of:
 a) generating a Message Authentication Code (MAC) $MAC(K_{MAC}, M)$ by a process for the plaintext M according to the method of generating the MAC by a processor using the stream cipher, comprising the steps of:
 (a1) dividing the plain text M into k n-bit message blocks, wherein k is an integer number,
 wherein each of the respective divided input message blocks have a unique integer number represented by the respective K integer number;
 (a2) encrypting by a processor each of the respective divided input message blocks using a result obtained by exclusive-ORing (XORing) with a different key,
 wherein the results by XORing each of the divided input message blocks has a different key from any of the other divided input message blocks,
 wherein each of the different keys is configured with a secret key $K_{MAC}$ for MAC generation with the unique integer number associated with the respective divided input message block, calculating respective intermediate values, and
 wherein the respective intermediate values hi are calculated by the following formula:

$$h_i = E_n(K_{MAC} \oplus i, m_i),$$

wherein the k n-bit message blocks obtained by dividing the input message M are denoted by m1, m2, ..., mk, one of the message blocks is denoted by mi, and En(K, mi) denotes an encryption algorithm performed for the message blocks mi using K as a key by the key stream generator;
 (a3) XORing the respective intermediate values resulting from step (a2); and
 (a4) encrypting, at a key stream generator, the result of step (a3) using the secret key $K_{MAC}$ for MAC generation and generating a MAC, and
 (b) generating a key stream using a stream cipher initialization vector IV and a secret key KENC for message encryption; and
 (c) exclusive-ORing (XORing) the key stream with a ciphertext C to generate a plaintext M.

9. The computer implemented method of claim 8, further comprising the steps of:
 (d) when the stream cipher initialization vector IV is the same as the MAC $MAC(K_{MAC}, M)$, determining the ciphertext C as a valid ciphertext (IV, C) and outputting the plaintext M for the valid ciphertext (IV, C).

10. The computer implemented method of claim 9, wherein in step (d), when the stream cipher initialization vector IV is not the same as the MAC $MAC(K_{MAC}, M)$, an error message is output.

11. The computer implemented method of claim 9, wherein in step (c), the MAC $MAC(K_{MAC}, M)$ for the plaintext M is generated from the plaintext M and the secret key $K_{MAC}$ for MAC generation.

* * * * *